United States Patent
Dong et al.

(10) Patent No.: US 12,523,863 B2
(45) Date of Patent: Jan. 13, 2026

(54) ELECTROSTATIC MEMS MICROMIRROR

(71) Applicant: Huawei Technologies Co., Ltd., Shenzhen (CN)

(72) Inventors: Xiaoshi Dong, Shenzhen (CN); Jinghui Xu, Shenzhen (CN); Fengpei Sun, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 315 days.

(21) Appl. No.: 18/477,744

(22) Filed: Sep. 29, 2023

(65) Prior Publication Data
US 2024/0019687 A1  Jan. 18, 2024

Related U.S. Application Data

(63) Continuation of application No. PCT/CN2022/080267, filed on Mar. 11, 2022.

(30) Foreign Application Priority Data

Apr. 9, 2021  (CN) .......................... 202110383730.4

(51) Int. Cl.
  G02B 26/08  (2006.01)
  B81B 7/02  (2006.01)

(52) U.S. Cl.
  CPC ............ G02B 26/0841 (2013.01); B81B 7/02 (2013.01); *B81B 2201/033* (2013.01);
  (Continued)

(58) Field of Classification Search
  CPC . G02B 26/0841; B81B 7/02; B81B 2201/033; B81B 2201/042; B81B 2201/045; B81B 2203/0136
  See application file for complete search history.

(56) References Cited

U.S. PATENT DOCUMENTS 7,986,073 B2  7/2011  Godil
8,238,018 B2  8/2012  Zhou
(Continued)

FOREIGN PATENT DOCUMENTS

CN  104297922 A  1/2015

OTHER PUBLICATIONS

Morgan, Brian et al., "Vertically-Shaped Tunable MEMS Resonators", Journal of Microelectromechanical Systems, vol. 17, No. 1, Digital Object Identifier: 10.1109/JMEMS.2007.910251, Feb. 2008, total 8 pages.

*Primary Examiner* — Euncha P Cherry
(74) *Attorney, Agent, or Firm* — Slater Matsil, LLP

(57) ABSTRACT

An electrostatic MEMS micromirror is provided, and may be used in a device such as a mobile phone, a microphone, a camera, a radar, or an optical switch. The electrostatic MEMS micromirror includes a support beam, a micromirror, and a drive component. The drive component includes a comb frame and a drive comb located in the comb frame. The support beam and the micromirror are mechanically coupled using the comb frame. Two sides of the comb frame that are mechanically coupled to the micromirror are separately located on two sides of a rotating axis determined by the support beam. The drive comb includes at least one comb pair. The comb pair includes a movable comb structure and a stationary comb structure. The movable comb structure includes a plurality of movable combs. One end of the movable comb is fastened to the comb frame.

20 Claims, 8 Drawing Sheets

(52) U.S. Cl.
CPC ... *B81B 2201/042* (2013.01); *B81B 2201/045* (2013.01); *B81B 2203/0136* (2013.01)

(56) References Cited

U.S. PATENT DOCUMENTS

| | | |
|---|---|---|
| 2005/0013087 A1 | 1/2005 | Wu et al. |
| 2006/0082250 A1* | 4/2006 | Ko .................... G02B 26/0841 359/225.1 |
| 2012/0275011 A1 | 11/2012 | Zhou |

* cited by examiner (a)

(b)

(c)

ELECTROSTATIC MEMS MICROMIRROR

CROSS-REFERENCE TO RELATED APPLICATIONS

This application is a continuation of International Application No. PCT/CN2022/080267, filed on Mar. 11, 2022, which claims priority to Chinese Patent Application No. 202110383730.4, filed on Apr. 9, 2021. The disclosures of the aforementioned applications are hereby incorporated by reference in their entireties.

TECHNICAL FIELD

This application relates to the field of micro-electromechanical technologies, and in particular, to an electrostatic MEMS micromirror.

BACKGROUND

A micro-electro-mechanical system (MEMS) technology is a type of a micro-electronic technology that integrates functional modules such as an electronic functional module, a mechanical functional module, and an optical functional module into a micron-level system. The MEMS technology integrates a mechanical component, an optical system, a drive component, and an electric control system into an overall unit, and the overall unit not only collects, processes, and sends information or instructions, but also takes actions based on the information. Compared with a conventional mechanical system, a system that uses the MEMS technology has advantages of miniaturization, integration, low energy consumption, low costs, high precision, and long life time, and is dynamic.

One important technology in modern optical communication industry is to achieve optical interconnection between a plurality of channels. A rotary MEMS device is one of key devices to achieve this technology. As shown in FIG. 1, under action of a drive voltage, a MEMS driver drives a reflective surface to rotate around a rotating axis, so that incident light can be accurately reflected to different ports.

An electrostatic MEMS micromirror is one type of rotary micro-electro-mechanical system products, and is driven electrostatically. An electrostatic drive technology is a technology that uses Coulomb force between charges as driving force for drive. A movable micromirror surface is rotated through electrostatic action, to change an optical path. A rotation angle range and stability of the electrostatic MEMS micromirror directly determine performance of the device. Expanding the rotation angle range means enabling reflected light to enter more ports, to implement multi-port optical switching. In addition, the stability of the electrostatic MEMS micromirror is interfered by factors such as residual stress, temperature change, and external impact. For example, the residual stress causes buckling of the device, and external impact causes fracture and failure of the device.

Therefore, performance improvements are desirable for electrostatic MEMS micromirrors.

SUMMARY

This application provides an electrostatic MEMS micromirror, to improve a rotation angle range and stability of the electrostatic MEMS micromirror.

According to a first aspect, an electrostatic MEMS micromirror is provided, including a support beam, a micromirror, and a drive component. The drive component includes a comb frame and a drive comb located in the comb frame. The support beam and the micromirror are connected by using the comb frame. Two sides of the comb frame that are connected to the micromirror are separately located on two sides of a rotating axis determined by an extension line of the support beam. The drive comb includes at least one comb pair. The comb pair includes a movable comb structure and a stationary comb structure. The movable comb structure includes a plurality of movable combs. One end of the movable comb is fastened to the comb frame. The stationary comb structure is configured to generate electrostatic force with the movable comb structure. A distance between a fixed end of the movable comb and the rotating axis is greater than a distance between the other end of the movable comb and the rotating axis.

In this embodiment of this application, the comb frame of the electrostatic MEMS micromirror is located on two sides of the rotating axis, and is in contact with the micromirror and supports the micromirror by using a plurality of points. In this design, a moment of inertia of an area of the electrostatic MEMS micromirror is increased, thereby improving stability of a device. In addition, one end of the movable comb is fastened to the comb frame. Because there is no comb frame near the rotating axis, a free end of the movable comb may be extended near the rotating axis to increase a length of the movable comb, thereby effectively improving driving force of the device, and further increasing the rotation angle range.

With reference to the first aspect, in some implementations of the first aspect, the comb frame is symmetrical about the rotating axis.

In this embodiment of this application, when the comb frame is symmetrical about the rotating axis, the driving force and the stability of the device are optimal.

With reference to the first aspect, in some implementations of the first aspect, a range of a vertical distance $L_o$ between a fixed point of the movable comb on the comb frame and the rotating axis meets the following relationship: $0.7T_1/\sin\theta \leq L_o \leq 1.1T_1/\sin\theta$, where $\theta$ is a maximum rotation angle of the micromirror, and $T_1$ is a thickness of the movable comb.

With reference to the first aspect, in some implementations of the first aspect, the electrostatic MEMS micromirror further includes at least one reinforcement rod, and both ends of the at least one reinforcement rod are fastened to the comb frame.

In this embodiment of this application, the reinforcement rod is introduced into the electrostatic MEMS micromirror, to mechanically connect and reinforce two sides of the comb frame, so that interference of a high-order mode can be suppressed, and the stability of the device can be further improved.

With reference to the first aspect, in some implementations of the first aspect, a width of the reinforcement rod is twice a width of the movable comb.

With reference to the first aspect, in some implementations of the first aspect, the stationary comb structure includes a plurality of stationary combs. The electrostatic MEMS micromirror further includes: a slot that is located at an opening of the movable comb and that faces the stationary comb, and/or a slot that is located at an opening of the stationary comb and that faces the movable comb.

With reference to the first aspect, in some implementations of the first aspect, the slot is a rectangular slot, a vertical distance between a center of the slot and the rotating axis is $d=h/\sin\alpha$, $\alpha$ is a rotation angle of the movable comb around the rotating axis, h is a thickness of the slot, α>0, 0<T/2≤h≤T, and T is a thickness of a comb in which the slot is located.

In this embodiment of this application, the slot is etched on the comb pair of the electrostatic MEMS micromirror, to enlarge a spacing between the movable comb and the stationary comb in a vertical direction, thereby enhancing driving force when the movable comb rotates to a specific rotation angle.

With reference to the first aspect, in some implementations of the first aspect, a shape of the slot is a step shape.

With reference to the first aspect, in some implementations of the first aspect, the electrostatic MEMS micromirror further includes a first drive component. The first drive component is located between the support beam and the drive component, or the first drive component is located between the drive component and the micromirror. The first drive component includes a comb rod and a drive comb, and the comb rod is located on the rotating axis. The drive comb includes at least one comb pair. The comb pair includes the movable comb structure and the stationary comb structure. The movable comb structure includes the plurality of movable combs. One end of the movable comb is fastened to the comb rod. The distance between the fixed end of the movable comb and the rotating axis is less than a distance between the other end of the movable comb and the rotating axis.

The electrostatic MEMS micromirror in this embodiment of this application may weaken attraction of a vertical comb pair in a y direction (a direction perpendicular to the rotating axis), thereby increasing a pickup voltage and enhancing the stability of the micromirror.

According to a second aspect, a micromirror array is provided. The micromirror array includes a plurality of electrostatic MEMS micromirrors arranged in an array manner in the first aspect and any implementation of the first aspect.

According to a third aspect, an optical switch is provided. The optical switch includes an input port array, an output port array, and at least one micromirror array in the second aspect. The input port array is configured to receive an optical signal. The optical signal is output through the output port array after being reflected by the at least one micromirror array.

According to a fourth aspect, an optical device is provided. The optical device includes a controller, and the electrostatic MEMS micromirror in the first aspect and any implementation of the first aspect, or the micromirror array in the second aspect.

According to a fifth aspect, a terminal device is provided. The terminal device includes a controller, and the electrostatic MEMS micromirror in the first aspect and any implementation of the first aspect, or the micromirror array in the second aspect.

DETAILED DESCRIPTION OF ILLUSTRATIVE EMBODIMENTS

The following describes technical solutions of this application with reference to accompanying drawings.

Figure 2:
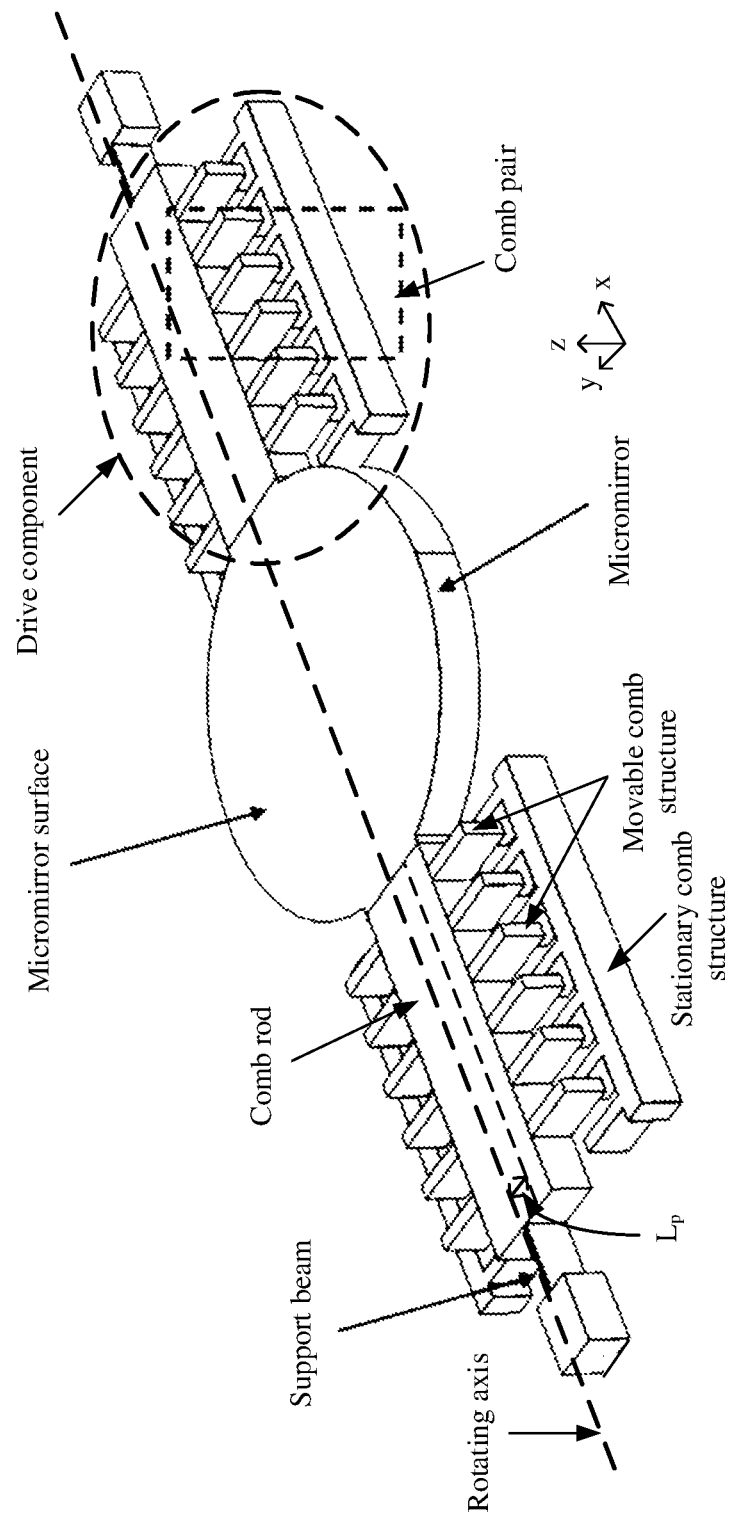
FIG. 2 is a three-dimensional diagram of an existing electrostatic MEMS micromirror.

FIG. 2 is a three-dimensional diagram of an existing electrostatic MEMS micromirror.

The electrostatic MEMS micromirror includes a support beam, a micromirror, and a drive component. The drive component is located between the support beam and the micromirror. Same drive components are separately arranged on left and right sides of the micromirror. The drive component is generally a conventional vertical comb drive actuator. The drive component includes a comb rod and a drive comb. The comb rod is located on a rotating axis of the electrostatic MEMS micromirror. The drive comb includes at least one comb pair staggered from each other in a vertical direction. The comb pair includes a stationary comb structure and a movable comb structure. The movable comb structure includes a plurality of movable combs. One end of the movable comb is fastened to the comb rod. A shape of a comb is usually designed as a simple rectangle or trapezoid. The electrostatic MEMS micromirror uses an electrostatic drive mode. An electrostatic drive technology is a technology that uses Coulomb force between charges as driving force for drive, that is, like poles repel, but opposite poles attract. When an electric field of any group of the comb pair changes, the electric field between combs changes to generate electrostatic force to drive the micromirror to twist.

Figure 3:
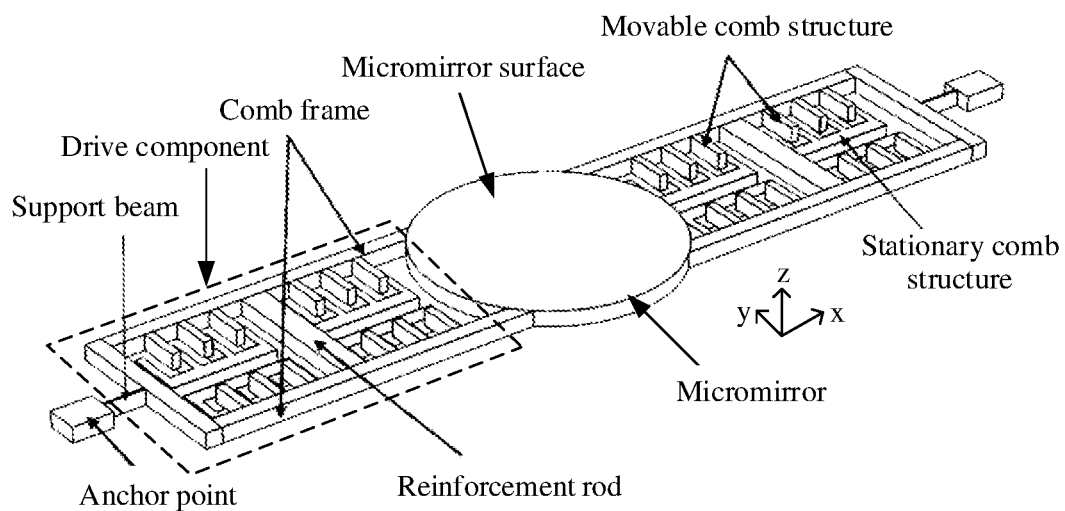
FIG. 3 is a three-dimensional diagram of an electrostatic MEMS micromirror according to this application.

FIG. 3 is a three-dimensional diagram of an electrostatic MEMS micromirror according to this application. The electrostatic MEMS micromirror includes a support beam, a micromirror, and a drive component. The drive component includes a comb frame and a drive comb provided in the comb frame. The support beam and the micromirror are connected by using the comb frame. Two sides of the comb frame that are connected to the micromirror are separately located on two sides of a rotating axis determined by an extension line of the support beam.

Optionally, as shown in FIG. 3, in a specific implementation, one drive component is disposed on each of left and right sides of the micromirror. Two sides that are in the comb frame on each side and that are connected to the micromirror are symmetrical about the rotating axis.

The drive comb includes at least one comb pair. The comb pair includes a movable comb structure and a stationary comb structure. The movable comb structure includes a plurality of movable combs. One end of the movable comb is fastened to the comb frame. The stationary comb structure is configured to generate electrostatic force with the movable comb structure, to drive the micromirror to translate or rotate with the comb frame around the rotating axis. A distance between a fixed end of the movable comb and the rotating axis is greater than a distance between the other end of the movable comb and the rotating axis.

It should be understood that the comb pair may be a parallel comb pair, or may be a vertical comb pair. This is not specifically limited in this application.

Optionally, the movable comb and a stationary comb may be a conventional rectangle or trapezoid.

Optionally, a shape of the micromirror is not limited in this application. For example, a micromirror surface may be a circle, a rectangle, an ellipse, or the like.

In an implementation, the electrostatic MEMS micromirror further includes at least one reinforcement rod. Both ends of the reinforcement rod are fastened to the comb frame, and are connected to frames of the comb frame that are on both upper and lower sides. Generally, a direction of the reinforcement rod is perpendicular to the rotating axis. A width of the reinforcement rod is greater than twice a width of the comb or twice a width of the support beam.

For unified description, a width of a component in this application means a distance of the component in an x direction, a length of a component in this application means a distance of the component in a y direction, and a thickness of a component in this application means a distance of the component in a z direction.

It should also be understood that perpendicularity herein is only used to facilitate description of a position of the reinforcement rod. In actual production, some deviations may occur due to a manufacturing process or manufacturing precision. This does not mean that the reinforcement rod needs to be totally perpendicular to the rotating axis.

It can be learned from the foregoing that the frames of the comb frame of the novel electrostatic MEMS micromirror provided in this application are located on two sides of the rotating axis, and are in contact with the micromirror and support the micromirror by using a plurality of points. The electrostatic MEMS micromirror may also be referred to as a reverse electrostatic MEMS micromirror in this application. A structure of the reverse MEMS micromirror can not only improve stability of a device, but also increase a rotation angle range of the device. In addition, the reinforcement rod is introduced into a reverse design, to mechanically connect and reinforce the frame of the comb frame on two sides, so that interference of a high-order mode can be suppressed, and the stability of the device can be further improved.

Figure 4:
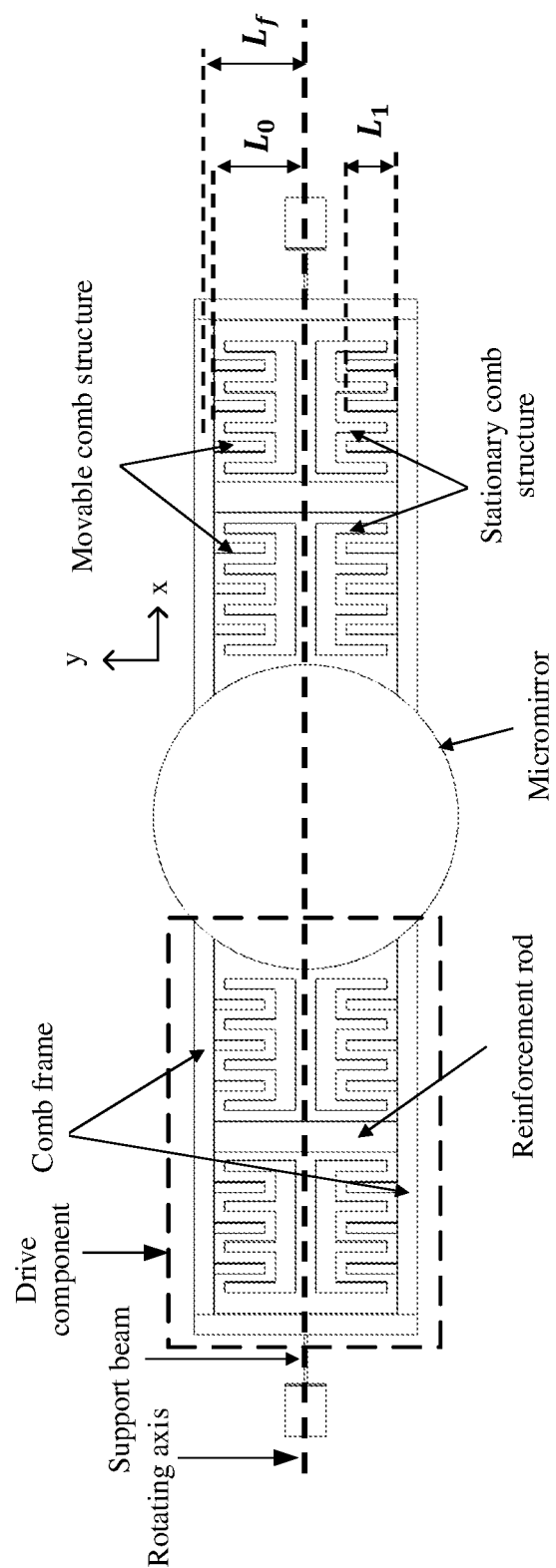
FIG. 4 is a top view of an electrostatic MEMS micromirror according to this application.

With reference to FIG. 4, the following specifically describes why the structure of the reverse MEMS micromirror can improve the rotation angle range of the micromirror and the stability of the micromirror, and how to adjust a maximum rotation angle of the micromirror.

FIG. 4 is a top view of an electrostatic MEMS micromirror according to this application. It should be understood that FIG. 3 and FIG. 4 are schematic diagrams of different angles of a same electrostatic MEMS micromirror. As shown in FIG. 4, a length of a movable comb is $L_1$. A vertical distance between a hanging point of the movable comb on a comb frame and a rotating axis is $L_o$. A vertical distance between a center position of any frame of the comb frame connected to the micromirror in a y direction and the rotating axis is $L_f$.

(1) $L_1$ is proportional to drive capacity of a drive component. In a reverse design, there is no comb frame near the rotating axis, so that the space near the rotating axis can be used. Specifically, a stationary comb may be infinitely close to the rotating axis in the y direction, so that a free end of the movable comb may be extended near the rotating axis to increase the length $L_1$ of the movable comb, thereby effectively improving driving force of the micromirror, and further increasing a rotation angle range.

(2) $L_f$ is proportional to a moment of inertia of an area of a micromirror device. The moment of inertia of an area is a geometric quantity commonly used to describe anti-bending performance of a cross section. A greater moment of inertia of an area indicates higher stability of the device. It can be learned that, in FIG. 2, a vertical distance between the center position of the comb frame in the y direction and the rotating axis is $L_p$. A length of $L_f$ is significantly greater than $L_p$. Therefore, the reverse design in this application increases the moment of inertia of an area of the electrostatic MEMS micromirror, thereby improving the stability of the device.

(3) $L_o$ may be adjusted based on a maximum rotation angle θ required by the micromirror device, and a range of $L_o$ may be determined according to a formula (1). $T_1$ is a thickness of the movable comb. The thickness is a thickness of the movable comb in the z direction.

$$0.7T_1/\sin\theta \leq L_0 \leq 1.1T_1/\sin\theta \quad (1)$$

Figure 5:
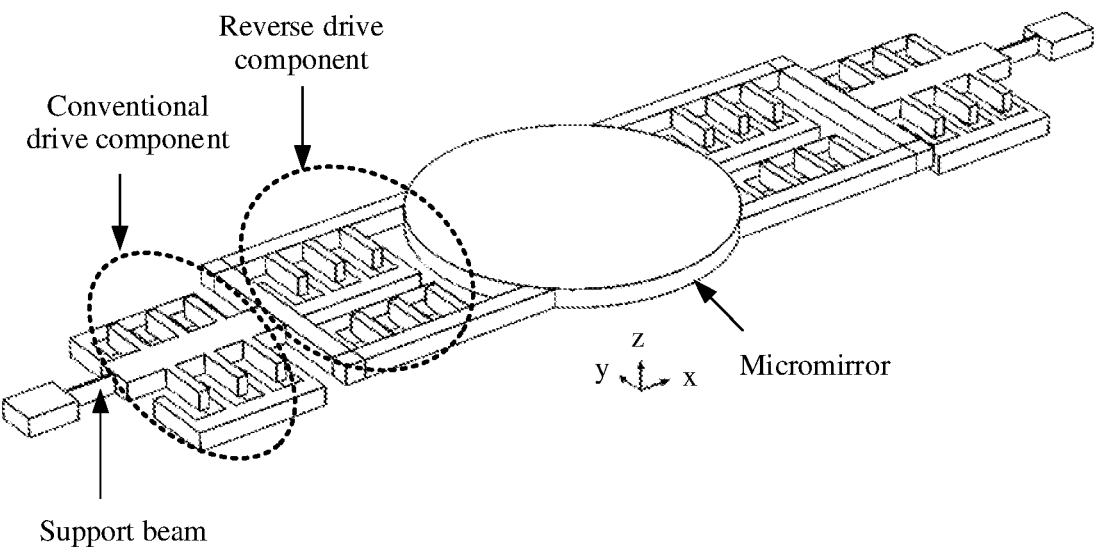
FIG. 5 is a three-dimensional diagram of a half-reverse electrostatic MEMS micromirror according to this application.

FIG. 5 is a three-dimensional diagram of a half-reverse electrostatic MEMS micromirror according to this application. It can be learned that a difference between the half-reverse MEMS micromirror and the MEMS micromirror shown in FIG. 3 lies in a composition of a drive component part. The drive component of the half-reverse MEMS micromirror is jointly formed by the conventional drive component in FIG. 2 and the reverse drive component in FIG. 3.

Optionally, as shown in FIG. 5, the conventional drive component may be located between a support beam and the reverse drive component.

Optionally, the conventional drive component may also be located between the reverse drive component and the micromirror.

An advantage of a half-reverse design is that attraction of a vertical comb pair in a y direction can be weakened, thereby increasing a pickup voltage and enhancing stability of the micromirror. For ease of understanding, a design principle of the half-reverse MEMS micromirror is specifically described herein with reference to FIG. 6.

Figure 6:
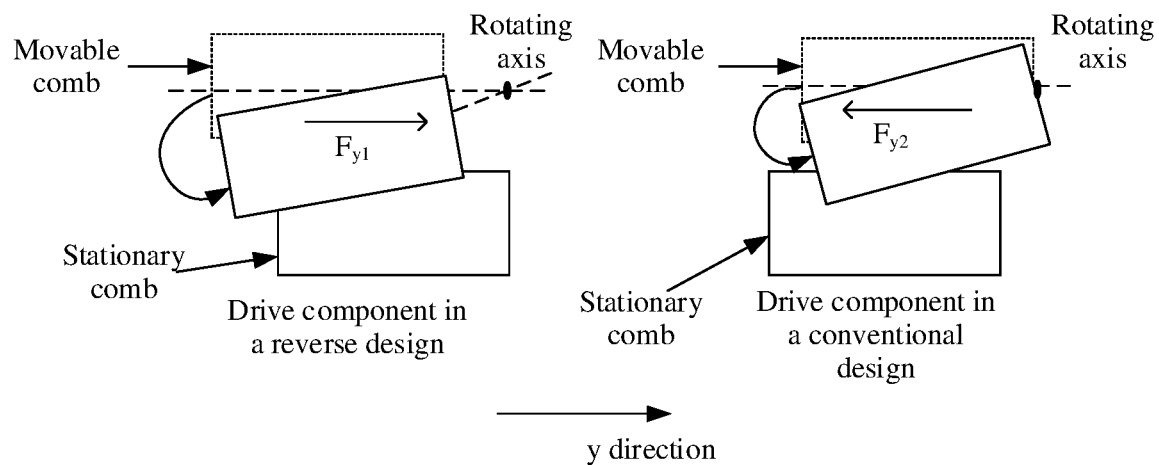
FIG. 6 is a schematic diagram of force-bearing of a half-reverse electrostatic MEMS micromirror in a y direction according to this application.

As shown in FIG. 6, a movable comb rotates around a rotating axis. For the drive component in a conventional design in FIG. 2, because a movable comb is located near a rotating axis, electrostatic attraction of a stationary comb to the movable comb is generally in a negative direction of a y axis, where a size of the electrostatic attraction is $F_{y2}$. For the drive component in the reverse design in FIG. 3, because the movable comb is moved away from the rotating axis along with the comb frame, the electrostatic attraction of the stationary comb to the movable comb is generally in a positive direction of the y axis, where a size of the electrostatic attraction is $F_{y1}$. A half-reverse design in this embodiment combines the conventional design and the reverse design, to balance external force applied to the movable comb in a y direction, thereby improving stability of a device. During actual application, a length ratio A between the drive component in the reverse design and the drive component in the conventional design may be adjusted based on a requirement. For example, $A=F_{y2}:F_{y1}$. In this case, the external force applied to the movable comb in the y direction is minimum.

Figure 7:
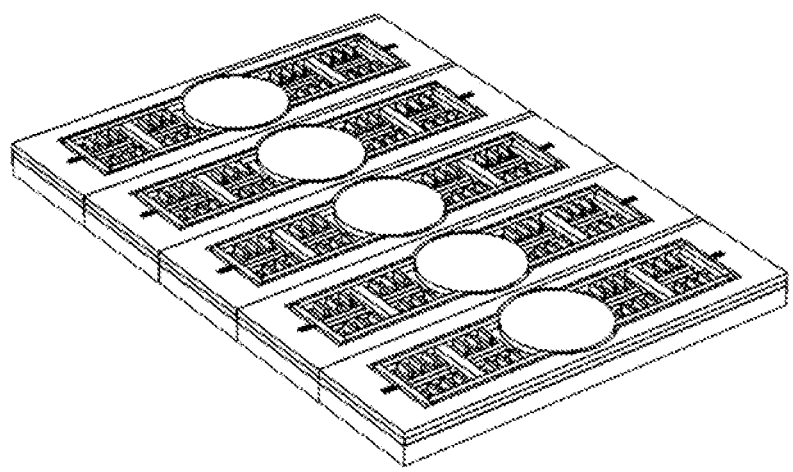
FIG. 7 is a three-dimensional diagram of an electrostatic MEMS micromirror array according to this application.

FIG. 7 is a three-dimensional diagram of an electrostatic MEMS micromirror array according to this application. The array micromirror includes a plurality of single electrostatic MEMS micromirrors. Any electrostatic MEMS micromirror forming the electrostatic MEMS micromirror array may be either the reverse electrostatic MEMS micromirror or the half-reverse electrostatic MEMS micromirror provided in this application.

The foregoing describes in detail a structure of the reverse electrostatic MEMS micromirror or the half-reverse electrostatic MEMS micromirror. The following describes a vertical comb pair provided in this embodiment of this application. A structure of the vertical comb pair in the drive component in the conventional design in FIG. 2 and a structure of the vertical comb pair in the drive component in the reverse design in FIG. 3 are optimized. An optimized vertical comb pair can further expand a rotation angle range of the micromirror.

Figure 8:
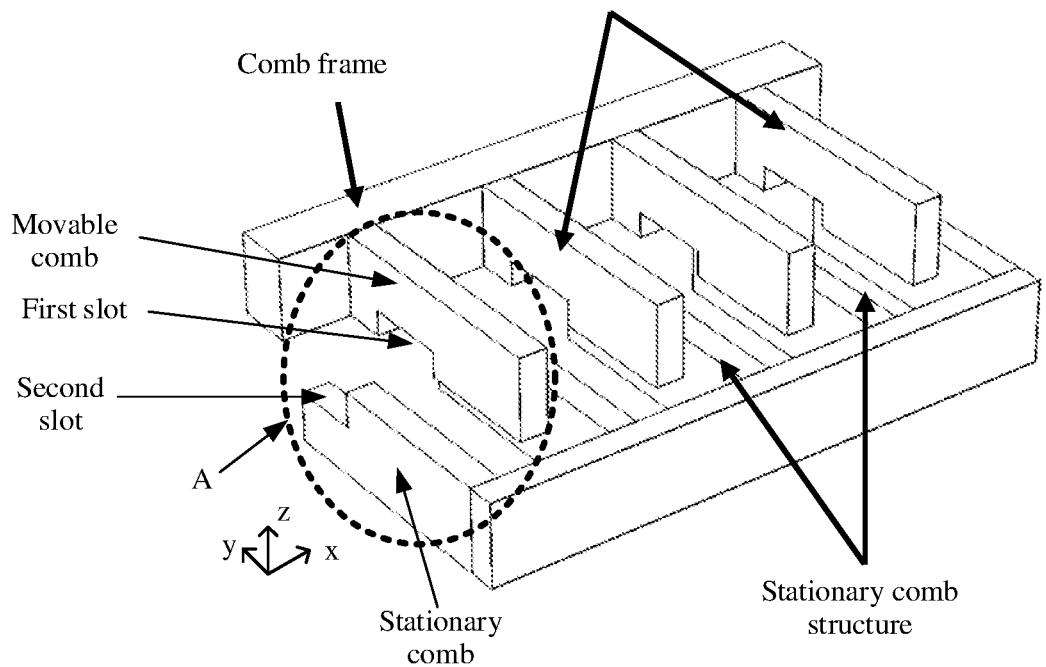
FIG. 8 is a three-dimensional diagram of a vertical comb pair according to this application.

FIG. 8 is a three-dimensional diagram of a vertical comb pair according to this application. It should be understood that FIG. 8 may be considered as a part of the drive component in the conventional design in FIG. 2, or may be considered as a part of the drive component in the reverse design in FIG. 3. For ease of description, it is specified in this application that a slot located on a movable comb is referred to as a first slot, and a slot located on a stationary comb is referred to as a second slot.

The vertical comb pair includes the first slot located on the movable comb, where an opening of the first slot faces the stationary comb; and/or the second slot located in the stationary comb, where an opening of the second slot faces the movable comb. The first slot and the second slot are used to enhance driving force between a stationary comb structure and a movable comb structure.

Figure 9:
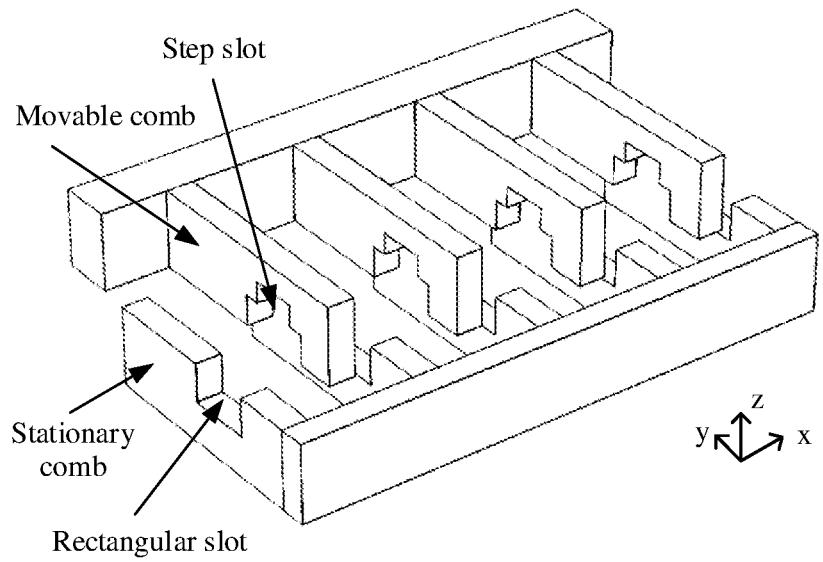
FIG. 9 is a three-dimensional diagram of another vertical comb pair according to this application.

Optionally, as shown in FIG. 9, the first slot and the second slot may be rectangular slots or step slots. It should be understood that FIG. 9 merely schematically shows an example that the first slot is the step slot, and the second slot is the rectangular slot.

It should be further understood that FIG. 8 merely schematically shows an example of a vertical comb pair that includes a first slot and a second slot, and the first slot and the second slot are rectangular slots.

It should be understood that an improved vertical comb in this embodiment may be applied to any vertical comb pair drive actuator. This is not limited in this application.

Figure 10:
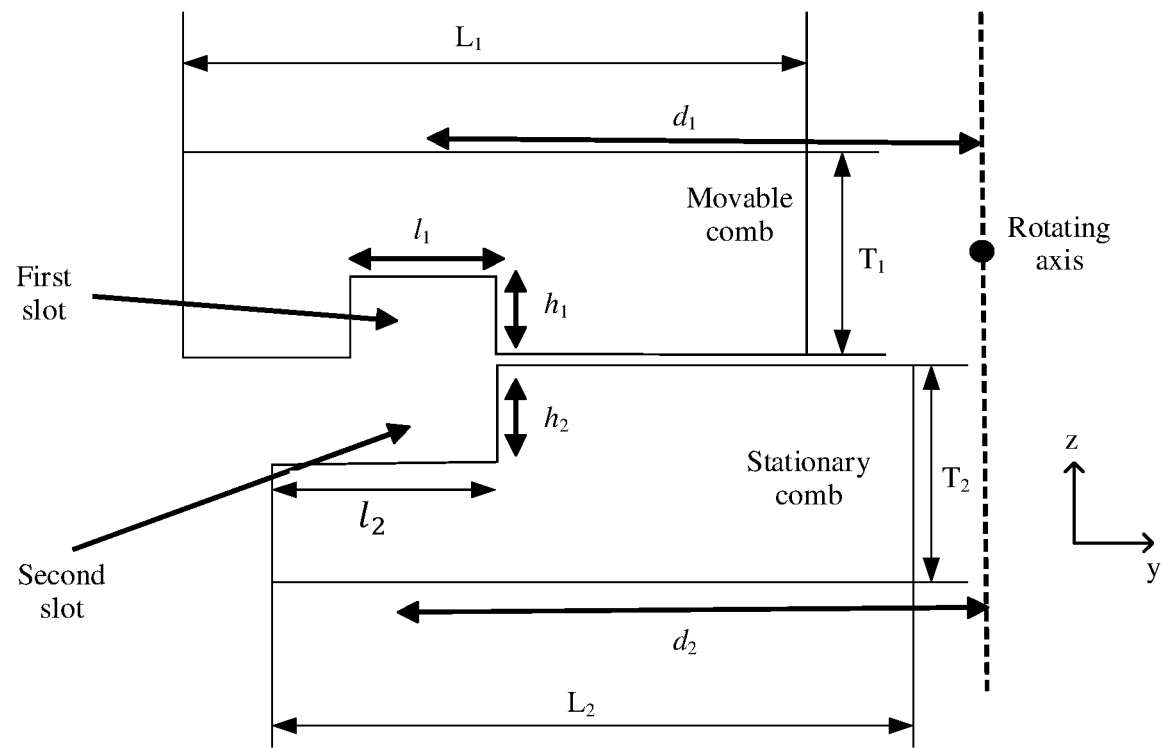
FIG. 10 is a left view of A in FIG. 8.

FIG. 10 is a left view of A in FIG. 8. In FIG. 10, a first slot is located on a movable comb, a second slot is located on a stationary comb, and both the first slot and the second slot are rectangular slots. Because the stationary comb is closer to a rotating axis in a y direction relative to the movable comb, FIG. 10 can be seen as a left view of the vertical comb pair in the reverse design in FIG. 3.

As shown in FIG. 10, a length of the movable comb is $L_1$, and a thickness of the movable comb is $T_1$. A length of the first slot is $l_1$, a thickness of the first slot is $h_1$, and a vertical distance between a center of the first slot and the rotating axis is $d_1$. A length of the stationary comb is $L_2$, and a thickness of the stationary comb is $T_2$. A length of the second slot is $l_2$, a thickness of the second slot is $h_2$, and a vertical distance between a center of the second slot and the rotating axis is $d_2$.

It may be understood that, because a slot is etched on the vertical comb pair provided in this application, a distance between an upper comb and a lower comb in a vertical direction becomes larger. Therefore, driving force is generated when the movable comb rotates at a large angle.

Figure 11:
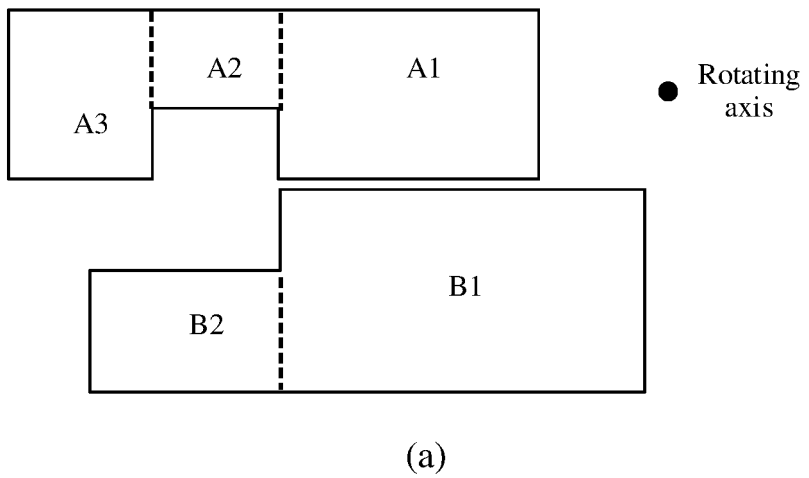
FIG. 11 is a schematic diagram of a principle of a vertical comb pair with three levels of drive actuators driving at a specific angle.
Figure 11:
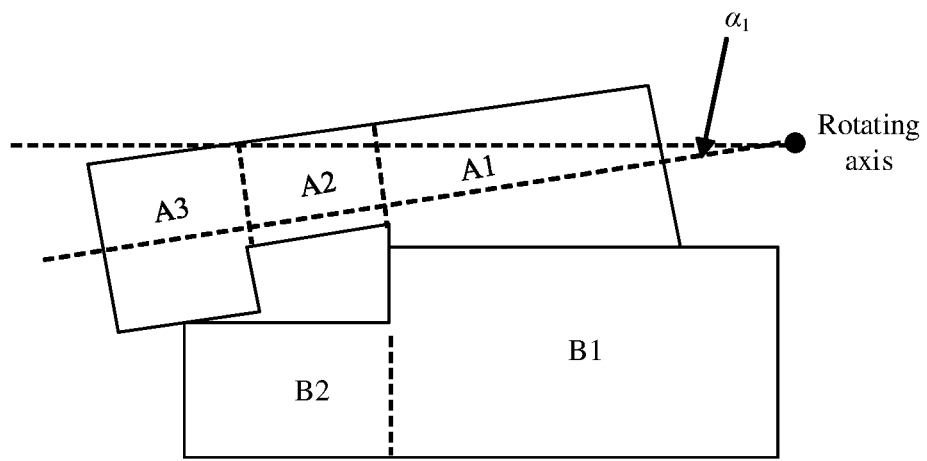
Figure 11:
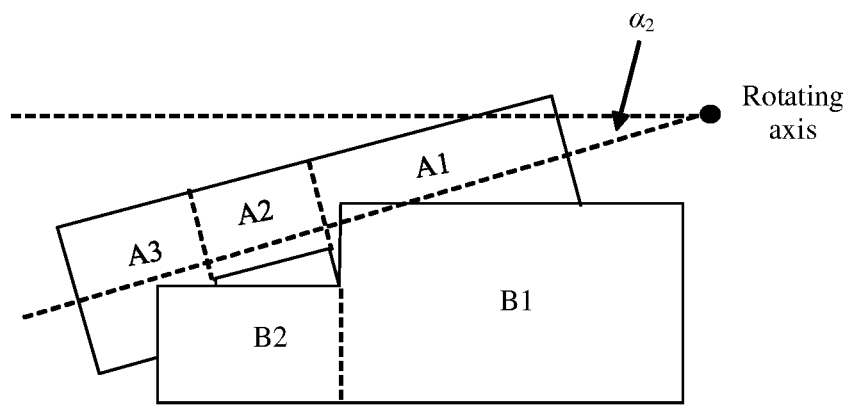

The following describes in detail a principle that the first slot and the second slot can enhance the driving force between a stationary comb structure and a movable comb structure with reference to FIG. 11.

It should be noted that FIG. 10 and FIG. 11 are same left views. For specific parameters of the movable comb, the stationary comb, the first slot, and the second slot in FIG. 11, refer to a description in FIG. 10. Details are not described herein again. As shown in FIG. 11, a movable comb is divided into three areas A1, A2, and A3 by a first slot, and a stationary comb is divided into two areas B1 and B2 by a second slot.

(1) As shown in (a) in FIG. 11, the movable comb and the stationary comb are not in a same plane in the case of power-off. When the movable comb starts to rotate, the area A1 and the area B1 are relatively close in a y direction. Under conditions that the stationary comb is grounded and the movable comb is connected to high voltage, electrostatic force between the stationary comb and the movable comb is generated due to a voltage difference, to form a first-level drive actuator. At this time, another area is far away. Consequently, electrostatic force that is generated is small, and contribution to driving force can be ignored.

(2) As shown in (b) in FIG. 11, when the movable comb rotates to an angle $\alpha_1$ ($\alpha_1 > 0$), areas A3 and B2 overlap in the y direction, and electrostatic force becomes stronger, to form second-level drive actuator. The angle $\alpha_1$ is determined based on a position of the first slot, where $d_1 = h_1/\sin \alpha_1$, and generally $T_1/2 \leq h_1 \leq T_1$, and the angle depends on different device requirements, where generally $1° \leq \alpha_1 \leq 8°$. A drive capacity of the second-level drive actuator manifests in a torque $M_1$ required for rotation, where $M_1 \propto d_1 * l_1$.

(3) As shown in (c) in FIG. 11, when the movable comb rotates to an angle $\alpha_2$ ($\alpha_2 > 0$), areas A2 and B2 overlap in the y direction, and electrostatic force becomes stronger, to form third-level drive actuator. The angle $\alpha_2$ is determined based on a position of the second slot, where $d_2 = h_2/\sin \alpha_2$, and generally, $T_2/2 \leq h_2 \leq T_2$, and the angle depends on different device requirements, where generally $8° \leq \alpha_2 \leq 15°$. A drive capacity of the third-level drive actuator manifests in a torque $M_2$ required for rotation, where $M_2 \propto d_2 * l_2$.

It should be understood that FIG. 10 and FIG. 11 merely schematically show a vertical comb pair with three levels of drive actuators. For another vertical comb pair with a multi-level drive actuator, driving force at another rotation angle may be increased by increasing a quantity of comb slots.

Based on a vertical comb structure with the multi-level drive actuator provided in this application, a specific slot is etched on the movable comb and/or a stationary comb, to enhance driving force at a specific angle or adjust a voltage angle relationship of a micromirror. A center of the slot and a thickness of the slot determine effect of improving a rotation angle of the micromirror.

This application further provides an optical switch. The optical switch includes an input port array, an output port array, and at least one micromirror array shown in FIG. 7. The input port array is configured to receive an optical signal. The optical signal is output through the output port array after being reflected by the at least one micromirror array.

This application further provides an optical device. The optical device includes a controller, and any electrostatic MEMS micromirror provided in this application, or the micromirror array shown in FIG. 7. For example, the optical device may be a wavelength selective switching (WSS), an optical power monitor (OPM), a variable optical attenuator (VOA), or the like. A terminal device is further provided. The terminal device includes a controller, and any electrostatic MEMS micromirror provided in this application, or the micromirror array shown in FIG. 7. For example, the terminal device may be a mobile phone, a camera, a microphone, a laser radar, or the like.

Figure 1:
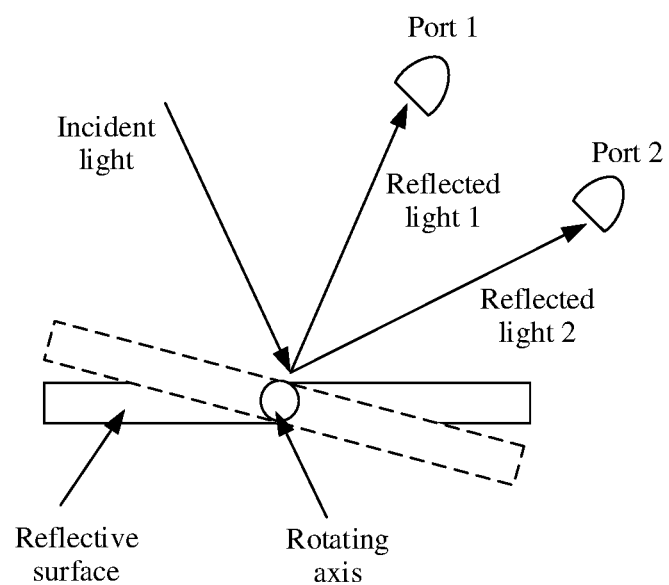
FIG. 1 is a schematic diagram of optical channel switching implemented by a rotary MEMS device.

The structure and principle of the vertical comb structure with the multi-level drive actuator are described in detail above. Because the structure of the comb is improved, a manufacturing process also needs to be improved accordingly. The following briefly describes a related manufacturing process flow by using the vertical comb with three levels of drive actuators in FIG. 1o as an example.

(1) A mask is made on the front of a wafer 1 through spin-coating, and then a second slot is etched.

(2) A mask is made on the front of the wafer 1 through spray-coating, and then a stationary comb is etched.

(3) A first slot is etched on the back of a wafer 2.

(4) The wafer 2 and the wafer 1 are bonded, to form a support anchor point.

(5) The wafer 2 is ground from the front of the wafer 2 to a specified thickness.

(6) A mask is made on the front of the wafer 2 through spin-coating, and then a movable comb is etched.

For a step comb slot, the spray-coating needs to be performed for a plurality of times, to form a mask, and the comb slot is etched for a plurality of times.

It should be noted that the foregoing are merely example embodiments of this application. A person skilled in the art may understand that this application is not limited to specific embodiments described herein, and a person skilled in the art can make various obvious changes, readjustments, mutual combinations, and replacements without departing from the protection scope of this application. Therefore, although this application is described in detail by using the foregoing embodiments, this application is not limited to the foregoing embodiments, and more other equivalent embodiments may be included without departing from the concept of this application. The scope of this application is determined by the scope of the appended claims.

What is claimed is:

1. An electrostatic MEMS micromirror comprising:
    a drive component, the drive component comprises a comb frame and a drive comb located in the comb frame;
    a support beam; and
    a micromirror,
    wherein the support beam and the micromirror are mechanically coupled by using the comb frame, and two sides of the comb frame that are mechanically coupled to the micromirror are separately located on two sides of a rotating axis determined by the support beam,
    wherein the drive comb comprises at least one comb pair, the comb pair comprises a movable comb structure and a stationary comb structure, the movable comb structure comprises a plurality of movable combs, one end of the movable comb is fastened to the comb frame, and the stationary comb structure is configured to generate electrostatic force with the movable comb structure, and
    wherein a distance between a fixed end of the movable comb and the rotating axis is greater than a distance between the other end of the movable comb and the rotating axis.

2. The electrostatic MEMS micromirror according to claim 1, wherein the comb frame is symmetrical about the rotating axis.

3. The electrostatic MEMS micromirror according to claim 1, wherein a range of a vertical distance $L_o$ between a fixed point of the movable comb on the comb frame and the rotating axis meets the following relationship:

$0.7T_1/\sin\theta \leq L_0 \leq 1.1T_1/\sin\theta$, wherein $\theta$ is a maximum rotation angle of the micromirror, and $T_1$ is a thickness of the movable comb.

4. The electrostatic MEMS micromirror according to claim 1, wherein the electrostatic MEMS micromirror further comprises at least one reinforcement rod, and both ends of the at least one reinforcement rod are fastened to the comb frame.

5. The electrostatic MEMS micromirror according to claim 4, wherein a width of the reinforcement rod is twice a width of the movable comb.

6. The electrostatic MEMS micromirror according to claim 1, wherein the stationary comb structure comprises a plurality of stationary combs, and the electrostatic MEMS micromirror further comprises:
    a slot that is located at an opening of the movable comb and that faces the stationary comb; and/or
    a slot that is located at an opening of the stationary comb and that faces the movable comb.

7. The electrostatic MEMS micromirror according to claim 6, wherein the slot is a rectangular slot, a vertical distance between a center of the slot and the rotating axis is $d=h/\sin\alpha$, $\alpha$ is a rotation angle of the movable comb around the rotating axis, h is a thickness of the slot, $\alpha>0$, $0<T/2 \leq h \leq T$, and T is a thickness of a comb in which the slot is located.

8. The electrostatic MEMS micromirror according to claim 6, wherein a cross-sectional shape of the slot is a step shape.

9. The electrostatic MEMS micromirror according to claim 1, further comprising:
    a first drive component, wherein the first drive component is located between the support beam and the drive component, or the first drive component is located between the drive component and the micromirror, wherein
    the first drive component comprises a comb rod and a drive comb, and the comb rod is located on the rotating axis; and
    the drive comb comprises at least one comb pair, the comb pair comprises the movable comb structure and the stationary comb structure, the movable comb structure comprises the plurality of movable combs, one end of the movable comb is fastened to the comb rod, and the distance between the fixed end of the movable comb and the rotating axis is less than the distance between the other end of the movable comb and the rotating axis.

10. A micromirror array comprising
    a plurality of electrostatic MEMS micromirrors arranged in an array manner, each of the plurality of electrostatic MEMS micromirrors comprising:
    a drive component, the drive component comprises a comb frame and a drive comb located in the comb frame;
    a support beam; and
    a micromirror,
        wherein the support beam and the micromirror are mechanically coupled by using the comb frame, and two sides of the comb frame that are mechanically coupled to the micromirror are separately located on two sides of a rotating axis determined by the support beam, wherein the drive comb comprises at least one comb pair, the comb pair comprises a movable comb structure and a stationary comb structure, the movable comb structure comprises a plurality of movable combs, one end of the movable comb is fastened to the comb frame, and the stationary comb structure is configured to generate electrostatic force with the movable comb structure; and wherein a distance between a fixed end of the movable comb and the rotating axis is greater than a distance between the other end of the movable comb and the rotating axis.

11. The micromirror array according to claim 10, wherein the comb frame is symmetrical about the rotating axis.

12. The micromirror array according to claim 10, wherein a range of a vertical distance $L_o$ between a fixed point of the movable comb on the comb frame and the rotating axis meets the following relationship:

$0.7T_1/\sin \theta \leq L_0 \leq 1.1T_1/\sin \theta$, wherein $\theta$ is a maximum rotation angle of the micromirror, and $T_1$ is a thickness of the movable comb.

13. The micromirror array according to claim 10, wherein the electrostatic MEMS micromirror further comprises at least one reinforcement rod, and both ends of the at least one reinforcement rod are fastened to the comb frame.

14. The micromirror array according to claim 13, wherein a width of the reinforcement rod is twice a width of the movable comb.

15. The micromirror array according to claim 10, wherein the stationary comb structure comprises a plurality of stationary combs, and the electrostatic MEMS micromirror further comprises:
- a slot that is located at an opening of the movable comb and that faces the stationary comb; and/or
- a slot that is located at an opening of the stationary comb and that faces the movable comb.

16. The micromirror array according to claim 15, wherein a cross-sectional shape of the slot is a step shape.

17. An optical switch comprising
an input port array;
an output port array; and
a micromirror array, the input port array is configured to receive an optical signal, and the optical signal is output through the output port array after being reflected by the micromirror array, the micromirror array comprising a plurality of electrostatic MEMS micromirrors arranged in an array manner, each of the plurality of electrostatic MEMS micromirrors comprising:
a drive component, the drive component comprises a comb frame and a drive comb located in the comb frame;
a support beam; and
a micromirror, wherein the support beam and the micromirror are mechanically coupled by using the comb frame, and two sides of the comb frame that are mechanically coupled to the micromirror are separately located on two sides of a rotating axis determined by the support beam, wherein the drive comb comprises at least one comb pair, the comb pair comprises a movable comb structure and a stationary comb structure, the movable comb structure comprises a plurality of movable combs, one end of the movable comb is fastened to the comb frame, and the stationary comb structure is configured to generate electrostatic force with the movable comb structure, and wherein a distance between a fixed end of the movable comb and the rotating axis is greater than a distance between the other end of the movable comb and the rotating axis.

18. The optical switch according to claim 17, wherein the comb frame is symmetrical about the rotating axis.

19. The optical switch according to claim 17, wherein a range of a vertical distance $L_o$ between a fixed point of the movable comb on the comb frame and the rotating axis meets the following relationship:

$0.7T_1/\sin \theta \leq L_0 \leq 1.1T_1/\sin \theta$, wherein $\theta$ is a maximum rotation angle of the micromirror, and $T_1$ is a thickness of the movable comb.

20. An optical device comprising:
a controller; and
an electrostatic MEMS micromirror, wherein the electrostatic MEMS micromirror comprises:
a support beam, a micromirror, and a drive component, wherein
the drive component comprises a comb frame and a drive comb located in the comb frame;
the support beam and the micromirror are mechanically coupled by using the comb frame, and two sides of the comb frame that are mechanically coupled to the micromirror are separately located on two sides of a rotating axis determined by the support beam;

wherein the drive comb comprises at least one comb pair, the comb pair comprises a movable comb structure and a stationary comb structure, the movable comb structure comprises a plurality of movable combs, one end of the movable comb is fastened to the comb frame, and the stationary comb structure is configured to generate electrostatic force with the movable comb structure; and wherein a distance between a fixed end of the movable comb and the rotating axis is greater than a distance between the other end of the movable comb and the rotating axis.

* * * * *